United States Patent
Parnin (10) Patent No.: US 10,161,314 B2
(45) Date of Patent: Dec. 25, 2018

(54) VENTED BUFFER AIR SUPPLY FOR INTERSHAFT SEALS

(71) Applicant: United Technologies Corporation, Farmington, CT (US)

(72) Inventor: Francis Parnin, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/484,424

(22) Filed: Apr. 11, 2017

(65) Prior Publication Data

US 2018/0291816 A1 Oct. 11, 2018

(51) Int. Cl.
*F16J 15/44* (2006.01)
*F02C 7/28* (2006.01)

(52) U.S. Cl.
CPC ............... *F02C 7/28* (2013.01); *F16J 15/44* (2013.01); *F05D 2220/32* (2013.01); *F05D 2240/60* (2013.01)

(58) Field of Classification Search
CPC ......... F02C 7/28; F16J 15/44; F05D 2220/32; F05D 2240/60
See application file for complete search history.

(56) References Cited

U.S. PATENT DOCUMENTS

| | | | |
|---|---|---|---|
| 5,643,026 A * | 7/1997 | Pietsch | B63H 23/321 277/320 |
| 6,957,816 B2 * | 10/2005 | Blease | F16J 15/104 251/327 |
| 7,413,194 B2 * | 8/2008 | Wright | F16J 15/3288 277/355 |
| 7,559,554 B2 * | 7/2009 | Hogg | F01D 11/02 277/412 |
| 7,591,631 B2 | 9/2009 | Hendricks et al. | |
| 8,540,479 B2 * | 9/2013 | Awtar | F01D 11/025 415/113 |
| 8,997,500 B2 | 4/2015 | Glahn et al. | |
| 9,022,390 B2 | 5/2015 | Amador | |
| 9,039,014 B2 * | 5/2015 | Pekris | F16J 15/406 277/431 |
| 9,170,174 B2 | 10/2015 | Furman et al. | |
| 9,382,844 B2 | 7/2016 | Muldoon et al. | |
| 2003/0097872 A1 | 5/2003 | Granitz et al. | |
| 2005/0206087 A1 * | 9/2005 | Hogg | F01D 11/02 277/355 |
| 2005/0235651 A1 | 10/2005 | Morris et al. | |
| 2010/0171271 A1 * | 7/2010 | Kung | F16J 15/43 277/410 |

(Continued)

OTHER PUBLICATIONS

EP search report for EP18155807.3 dated Aug. 10, 2018.

*Primary Examiner* — Gilbert Y Lee
(74) *Attorney, Agent, or Firm* — O'Shea Getz P.C.

(57) ABSTRACT

Aspects of the disclosure are directed to a system associated with an engine having a central longitudinal axis, comprising: a first shaft axially extend along the central longitudinal axis, a second shaft coaxial with the first shaft, a first air seal that seals between the first shaft and the second shaft at a first axial location, a second air seal that seals between the first shaft and the second shaft at a second axial location, a high pressure compressor section that provides air to the first air seal and the second air seal, at least one buffer passage, and a meter connected to the buffer passage that exhausts a portion of the air.

10 Claims, 5 Drawing Sheets

(56) References Cited

U.S. PATENT DOCUMENTS

| | | |
|---|---|---|
| 2012/0156005 A1 | 6/2012 | Nielsen et al. |
| 2013/0177406 A1 | 7/2013 | Heaton et al. |
| 2014/0069100 A1* | 3/2014 | Larson .................. F01D 11/003 60/726 |
| 2014/0238042 A1 | 8/2014 | Munsell et al. |

* cited by examiner

VENTED BUFFER AIR SUPPLY FOR INTERSHAFT SEALS

STATEMENT REGARDING FEDERALLY SPONSORED RESEARCH OR DEVELOPMENT

This invention was made with government support under contract number FA8626-16-C-2139 awarded by the United States Air Force. The government has certain rights in the invention.

BACKGROUND

Figure 2:
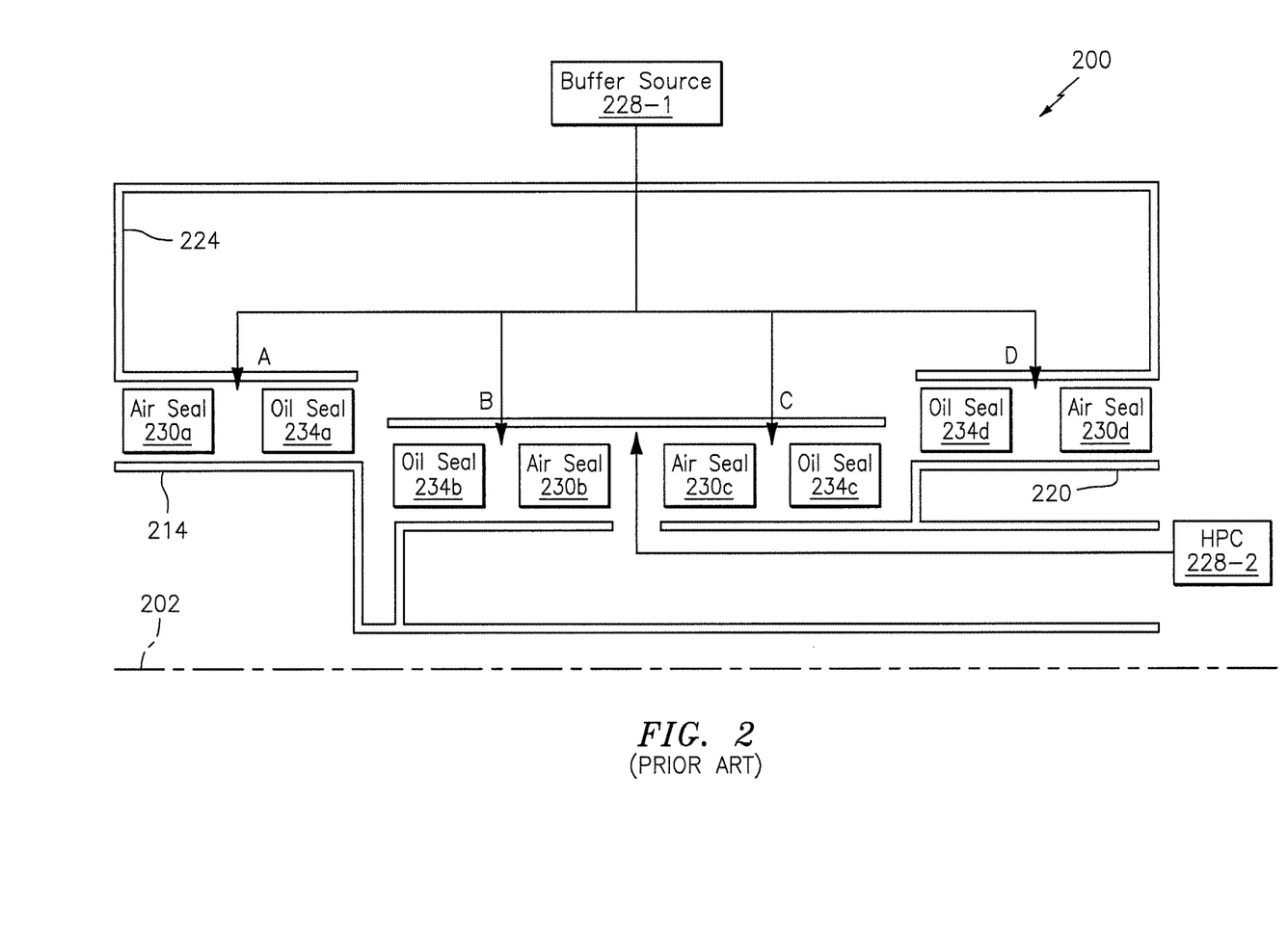
FIG. 2 illustrates a simplified illustration of a system of an engine that incorporates seals in accordance with the prior art.

Gas turbine engines, such as those which power aircraft and industrial equipment, employ a compressor to compress air that is drawn into the engine and a turbine to capture energy associated with the combustion of a fuel-air mixture. Referring to FIG. 2, a prior art system 200 associated with an engine is shown. The system 200 is referenced with respect to a centerline/axis 202. For example, the components of the system 200 that are described below are arranged relative to the axis 202 as shown in FIG. 2.

The system 200 is shown as part of a two-spool configuration that includes a first, low speed shaft 214 and a second, high speed shaft 220. The shafts 214 and 220 are rotatably supported by a plurality of bearings contained within a bearing compartment 224.

In FIG. 2, various locations of the engine are denoted by letters A-D. At each of these locations A-D, a pair of seals are shown. Seals are used in the system 200 to isolate a fluid from one or more areas/regions of the engine. Seals control various parameters (e.g., temperature, pressure) within the areas/regions of the engine and ensure proper/efficient engine operation and stability. At location A, an air seal 230a and an oil seal 234a are shown. At location B, an air seal 230b and an oil seal 234b are shown. At location C, an air seal 230c and an oil seal 234c are shown. At location D, an air seal 230d and an oil seal 234d are shown.

The seals 230a and 234a are used to seal the bearing compartment 224 with respect to the shaft 214. The seals 230d and 234d are used to seal the bearing compartment 224 with respect to the shaft 220. The seals 230b, 234b, 230c, and 234c are used to provide intershaft sealing between the shafts 214 and 220, in an area/region where the shafts 214 and 220 interact with or surround one another.

A buffer source 228-1 provides air that interfaces to/between each of the pairs of seals (e.g., air seal and oil seal) at the respective locations A-D. Conventionally, the buffer source 228-1 originates from one or more stages of a low pressure compressor (LPC), such as for example an axially aft-most stage of the LPC. In some instances, the air from the buffer source 228-1 may be at a greater pressure than the air pressure associated with a high pressure compressor (HPC) source 228-2, such that air may flow from the buffer source 228-1, across the air seals 230b and 230c, and into the sink represented by the HPC 228-2. In other instances, the air from the buffer source 228-1 may be at a lower pressure than the air pressure associated with the high pressure compressor (HPC) source 228-2, such that air may flow from the HPC source 228-2, across the air seals 230b and 230c, and into the sink represented by the buffer source 228-1. Typical, commercially available off the shelf (COTS) seals that may otherwise be used for the air seals 230b and 230c may not be configured to operate in such a manner, such that the air flowing across the air seals 230b and 230c as described above may degrade the service lifetime of such air seals 230b and 230c and/or render the air seals 230b and 230c inoperative, increasing pressure in the sink represented by 228-1. This increased pressure may further degrade oil seals 234b and 234c such that there may be an increased risk/potential of oil leaking out of the bearing compartment 224.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine having a central longitudinal axis, comprising: a first shaft axially extended along the central longitudinal axis, a second shaft coaxial with the first shaft, a first air seal that seals between the first shaft and the second shaft at a first axial location, a second air seal that seals between the first shaft and the second shaft at a second axial location, a high pressure compressor section that provides air to the first air seal and the second air seal, at least one buffer passage, and a meter connected to the buffer passage that exhausts a portion of the air. In some embodiments, the first air seal and the second air seal regulate a flow of air entering the buffer passage. In some embodiments, the system further comprises: a bearing compartment, a third air seal that seals between the first shaft and the bearing compartment at a third axial location, and a fourth air seal that seals between the second shaft and the bearing compartment at a fourth axial location. In some embodiments, the third air seal and the fourth air seal consume a portion of the air that is in the buffer passage. In some embodiments, the system further comprises: a first drain substantially located at the third axial location, and a second drain substantially located at the fourth axial location. In some embodiments, the meter exhausts the portion of the air to a gas path. In some embodiments, the gas path is a core gas path. In some embodiments, the meter exhausts the portion of the air to an overboard location. In some embodiments, the overboard location includes an external, ambient environment relative to the engine. In some embodiments, the meter exhausts the portion of the air to a gearbox. In some embodiments, the meter includes an orifice plate. In some embodiments, the meter includes a venturi tube. In some embodiments, the system further comprises: a first oil seal that is substantially located at the first axial location, and a second oil seal that is substantially located at the second axial location. In some embodiments, the system further comprises: a third oil seal that is substantially located at a third axial location, and a fourth oil seal that is substantially located at a fourth axial location.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 1:
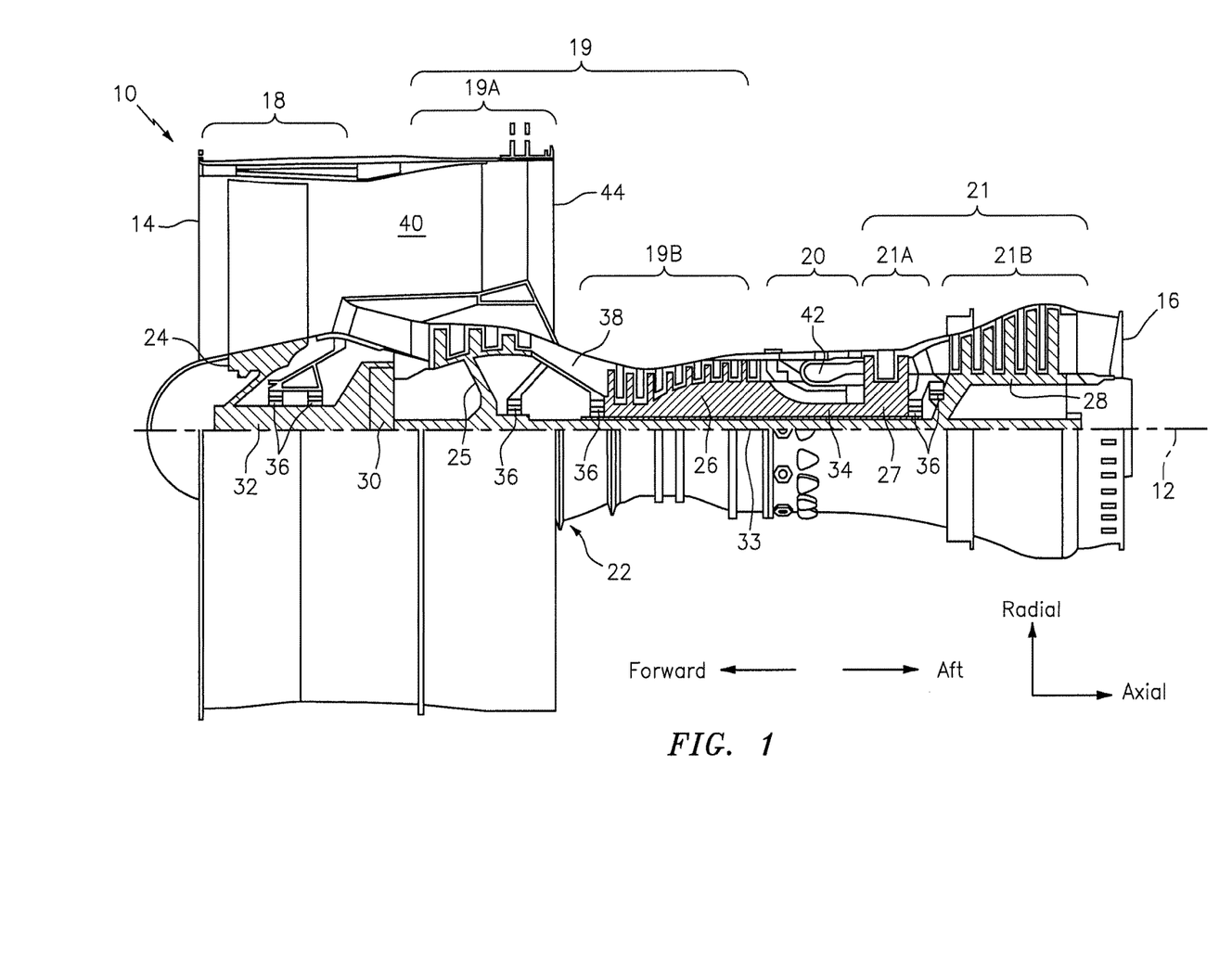
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3:
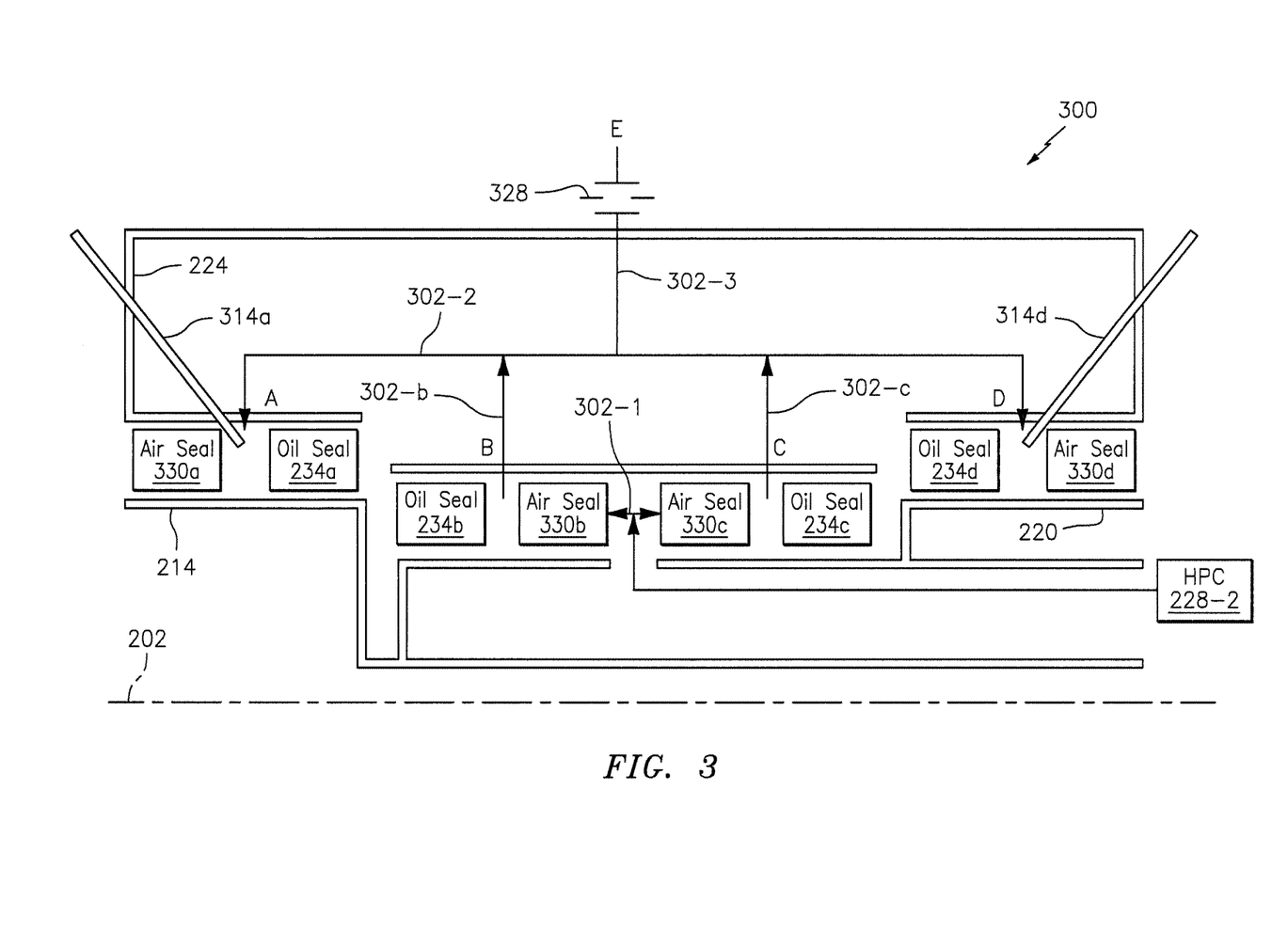
FIG. 3 illustrates a simplified illustration of a system of an engine that incorporates seals in accordance with aspects of this disclosure.

Referring to FIG. 3, a simplified illustration of a vented buffer air supply system 300 for, e.g., intershaft seals is shown. Differences between the system 200 and the system 300 are described below.

The system 300 may include an air seal 330a at the A location, an air seal 330b at the B location, an air seal 330c at the C location, and an air seal 330d at the D location. At the A location, the air seal 230a and the oil seal 234a may be used to seal the bearing compartment 224 with respect to the shaft 214. At the D location, the air seal 230d and the oil seal 234d may be used to seal the bearing compartment 224 with respect to the shaft 220. At the B and C locations, the air seal 230b, the oil seal 234b, the air seal 230c, and the oil seal 234c may be used to provide intershaft sealing between the shafts 214 and 220, in an area/region where the shafts 214 and 220 interact with or surround one another.

The seals 330b and 330c may correspond to the seals 230b and 230c, respectively. Alternatively, the seals 330b and 330c may differ from the seals 230b and 230c in terms of at least one parameter/property. For example, the seals 330b and 330c may be made of a different material, may be of a different size/dimension, etc., relative to the seals 230b and 230c. This variation in parameter/property may alter a sealing capability of the seals 330b and 330c relative to the seals 230b and 230c.

As shown in FIG. 3, the HPC 228-2 (which may correspond to the high pressure compressor (HPC) section 19B of FIG. 1) may be used as a source of air for buffering the seals. Stated slightly differently, the system 300 may not utilize a buffer source (e.g., the buffer source 228-1 of FIG. 2) in relation to pressurizing the bearing compartment 224. In FIG. 3, air from the HPC 228-2 (denoted by arrows/channels/passages 302-1) may be used/consumed with respect to the seals at the B and C locations. A portion of the air from the HPC 228-2 (denoted by arrows/buffer passages 302-2) may be used/consumed with respect to the seals at the A and D locations. Air may be provided to the buffer passages 302-2 via the passage 302-b and the passage 302-c. The seals at the B and C locations may help to regulate the air that enters the buffer passages 302-2.

For COTS seals that may be used for one or more of the seals (e.g., the seals 330b and 330c) in the system 300, the seals may tend to exhibit little leakage. In order to realize a sufficient pressure drop (e.g., a pressure drop greater than a threshold) across the seals 330b and 330c, a meter 328 may be used. The meter 328 may be used to increase the mass flow through the system 300. In this respect, the inclusion of the meter 328 may enable the seals 330b and 330c to throttle pressure to levels acceptable for use of optimum COTS seals. Stated slightly differently, the inclusion of the meter 328 may enable adjustments to be made to, e.g., pressure or mass flow based on changing environmental conditions (e.g., changes in the pressure of the air from the HPC 228-2, changes in pressure inside the bearing compartment 224, etc.).

The meter 328 may exhaust a portion of the air from the HPC 228-2 via a passage 302-3 to a low pressure location E. The passage 302-3 may be fluidly coupled to one or more of the passage 302-b, the passage 302-c, or the passage 302-2.

The location E may represent one or more of a gas path (e.g., a core gas path), an overboard location (e.g., an external, ambient environment relative to the engine), a gearbox, etc. The use of a gearbox in connection with the location E may provide a benefit in containment of any oil that may otherwise be included in the air in the passage 302-3.

Figure 4:
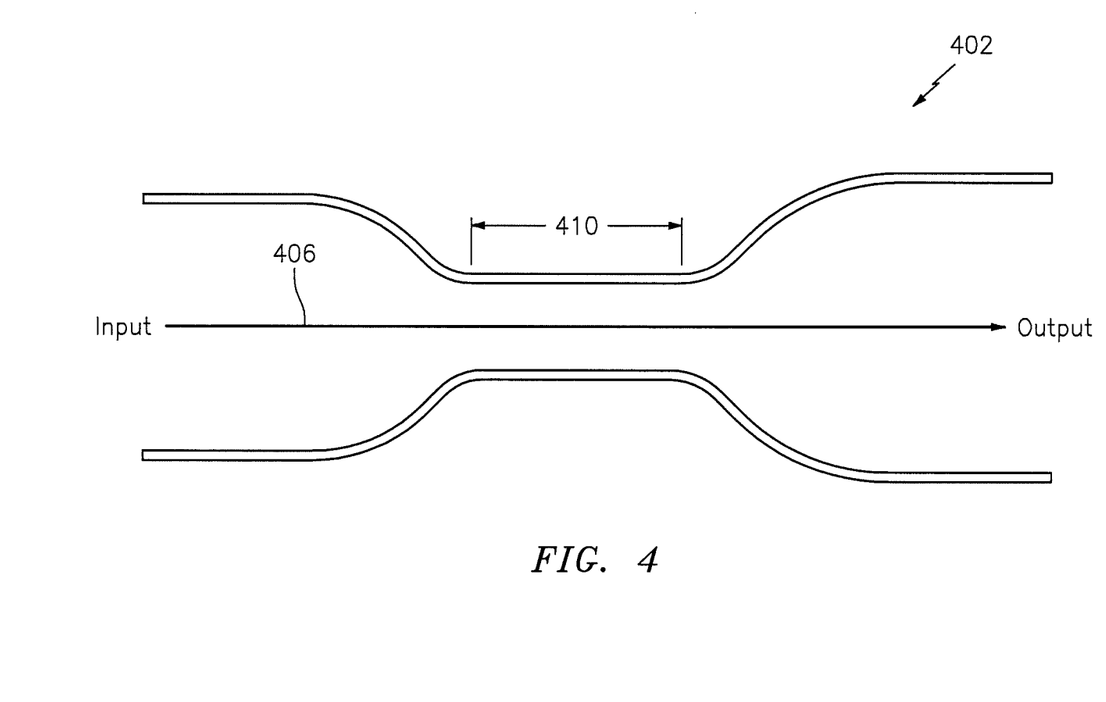
FIG. 4 illustrates a venturi tube in accordance with aspects of this disclosure.

In some embodiments, the meter 328 may include a venturi tube. Referring to FIG. 4, an illustrative venturi tube 402 is shown, where the input to the venturi tube 402 may correspond to the portion of the air in the passage 302-3 of FIG. 3 and the output of the venturi tube 402 may correspond to the location E of FIG. 3. As one skilled in the art would appreciate, the pressure of a flow 406 through the venturi tube 402 may decrease and the speed of the flow 406 may increase in terms of the flow 406 transitioning from the input to a constricted area/region 410 of the venturi tube 402. The pressure of the flow 406 through the venturi tube 402 may increase and the speed of the flow 406 may decrease in terms of the flow 406 transitioning from the constricted area/region 410 to the output. FIG. 4 represents one configuration for a venturi tube. Other configurations/types of venturi tubes may be used in some embodiments.

Figure 5:
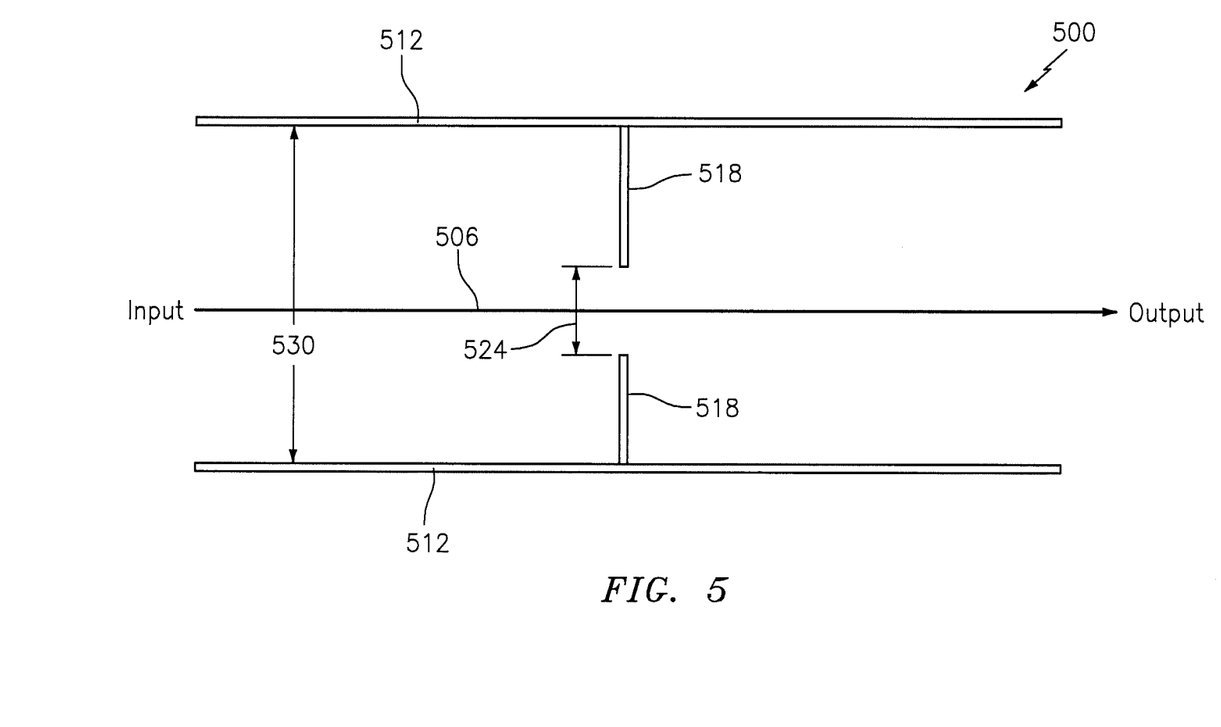
FIG. 5 illustrates a system incorporating an orifice plate in accordance with aspects of this disclosure.

Referring to FIG. 5, a system 500 is shown. Aspects of the system 500 may be incorporated as part of the meter 328 of FIG. 3. The system 500 may include a pipe/conduit formed from a pipe wall 512. A flow 506 may traverse the pipe from an input to an output as shown in FIG. 5. The input of the pipe may correspond to the portion of the air 302-3 of FIG. 3 and the output of the pipe may correspond to the location E of FIG. 3. At a given position of the pipe an orifice plate 518 may be included. The orifice plate 518 may present a constriction to the flow 506, similar to the constricted area/region 410 of FIG. 4. For example, a dimension of a hole/orifice in the orifice plate 518, as represented by arrow 524 may be less than a dimension of the pipe as represented by the arrow 530. FIG. 5 represents one configuration for an orifice plate. Other types/configurations of orifice plates may be used in some embodiments.

Referring back to FIG. 3, in some embodiments the meter 328 may include a vent and a passive or actively controlled valve. However, the use of such a vent and valve in conjunction with the meter 328 may represent additional cost (in terms of weight and complexity) relative to the use of an orifice plate or a venturi tube as described above.

In some embodiments, as an alternative to (or, in addition to) the inclusion of the meter 328 to increase mass flow, drains 314a and 314d may be included at the A and D locations, respectively. The drains 314a and 314d may be used in conjunction with overboard diagnostics. The drains 314a and 314d may serve a similar function/purpose to the meter 328, e.g., increasing mass flow and throttling pressure, by exhausting at least a portion of the air that enters the buffer passages 302-2.

In some embodiments, leakage through the seals 330a and 330d may be used to increase mass/air flow in the system 300. For example, the seals 330a and 330d may tend to leak more than the seals 230a and 230d in FIG. 2, respectively. In some embodiments, the seals 330a and 330d may tend to leak 1.5-2 times as much as the seals 230a and 230d, respectively.

Aspects of the disclosure have been described in terms of air that is supplied to one or more seals, such as for example intershaft air seals. Aspects of the disclosure enable a source of air, such as for example air sourced from a high pressure compressor section, to be used in conjunction with the seals. The combination of the intershaft air seals and, e.g., a meter allows for a reduction of pressure as air enters the bearing compartment and a throttling of the pressure to predetermined levels. Aspects of the disclosure may enable the use of COTS seals while avoiding the need to utilize higher-capability seals that are prone to heating.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system associated with an engine having a central longitudinal axis, comprising:
    a first shaft axially extended along the central longitudinal axis;
    a second shaft coaxial with the first shaft;
    a first air seal that seals between the first shaft and the second shaft at a first axial location;
    a second air seal that seals between the first shaft and the second shaft at a second axial location;
    a high pressure compressor section that provides air to the first air seal and the second air seal;
    at least one buffer passage; and
    a meter connected to the buffer passage that exhausts a portion of the air,
    a bearing compartment;
    a third air seal that seals between the first shaft and the bearing compartment at a third axial location;
    a fourth air seal that seals between the second shaft and the bearing compartment at a fourth axial location,
    a first air drain substantially located at the third axial location to exhaust air in the at least one buffer passage; and
    a second air drain substantially located at the fourth axial location to exhaust air in the at least one buffer passage;
    wherein the first air seal and the second air seal regulate a flow of air entering the buffer passage,
    wherein the third air seal and the fourth air seal consume a portion of the air that is in the buffer passage.

2. The system of claim 1, wherein the meter exhausts the portion of the air to a gas path.

3. The system of claim 2, wherein the gas path is a core gas path.

4. The system of claim 1, wherein the meter exhausts the portion of the air to an overboard location.

5. The system of claim 4, wherein the overboard location includes an external, ambient environment relative to the engine.

6. The system of claim 1, wherein the meter exhausts the portion of the air to a gearbox.

7. The system of claim 1, wherein the meter includes an orifice plate.

8. The system of claim 1, wherein the meter includes a venturi tube.

9. The system of claim 1, further comprising:
   a first oil seal that is substantially located at the first axial location; and
   a second oil seal that is substantially located at the second axial location.

10. The system of claim 9, further comprising:
    a third oil seal that is substantially located at a third axial location;
    a fourth oil seal that is substantially located at a fourth axial location.

\* \* \* \* \*